United States Patent
Kerner et al.

(10) Patent No.: US 7,594,136 B2
(45) Date of Patent: Sep. 22, 2009

(54) PAGING-TRIGGERED CORRUPTED FILE RECOVERY

(75) Inventors: Matthew Kerner, Seattle, WA (US); Kai Chen, Bellevue, WA (US); Chandramouli Natesa Srinivasan, Kirkland, WA (US); Jonathan Au, Calgary (CA)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/406,671

(22) Filed: Apr. 19, 2006

(65) Prior Publication Data

US 2007/0260919 A1 Nov. 8, 2007

(51) Int. Cl.
*G06F 11/00* (2006.01)
(52) U.S. Cl. .................. 714/5; 714/42; 714/54
(58) Field of Classification Search .......... 714/5, 714/38, 42, 54, 732
See application file for complete search history.

(56) References Cited

U.S. PATENT DOCUMENTS

| | | | |
|---|---|---|---|
| 6,745,346 B2 * | 6/2004 | Quach et al. ............... | 714/42 |
| 7,007,200 B2 * | 2/2006 | Salem ........................ | 714/26 |
| 7,308,610 B2 * | 12/2007 | Kuramkote et al. ......... | 714/38 |
| 7,353,445 B1 * | 4/2008 | Barreh et al. ............... | 714/758 |
| 2006/0161761 A1 * | 7/2006 | Schwartz et al. ............ | 711/216 |
| 2008/0015808 A1 * | 1/2008 | Wilson et al. ............... | 702/123 |

* cited by examiner

*Primary Examiner*—Robert Beausoliel
*Assistant Examiner*—Philip Guyton
(74) *Attorney, Agent, or Firm*—Marshall, Gerstein & Borun LLP (57) ABSTRACT

When a user-mode inpage error occurs after the system has booted up, the inpage error handling method attempts to prevent future crashes by repairing the faulting file. The fault may be a corrupt file or may be a disk I/O problem. The next time the now-repaired file is requested, execution should continue normally.

19 Claims, 8 Drawing Sheets

PAGING-TRIGGERED CORRUPTED FILE RECOVERY

BACKGROUND

Some operating systems handle corrupted system files "gracefully." If the undamaged portion of the file was still usable; failures occurred only when the corruption directly affected the code path taken in the binary and repair was a simple copy operation of a pristine copy of the same file, often from DllCache. In future operating systems, the system may become more brittle. Code Integrity (CI) may prevent code from being paged in once corruption is detected, even if only a single bit is corrupted. This corruption can be attributed to malicious activity or due to simple bit rot on the disk. These failures may cause user-mode crashes when inpage attempts fail. It is speculated that these errors will happen after extended use of the disk. In addition to the code integrity issue, inpage errors occur when bad blocks prevent the system from reading code from the disk.

SUMMARY

When a user-mode inpage error occurs after the system has booted up, the inpage error handler attempts to prevent future crashes by repairing the faulting file. The fault may be a corrupt file or may be a disk I/O problem. The next time the now-repaired file is requested, execution should continue normally.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
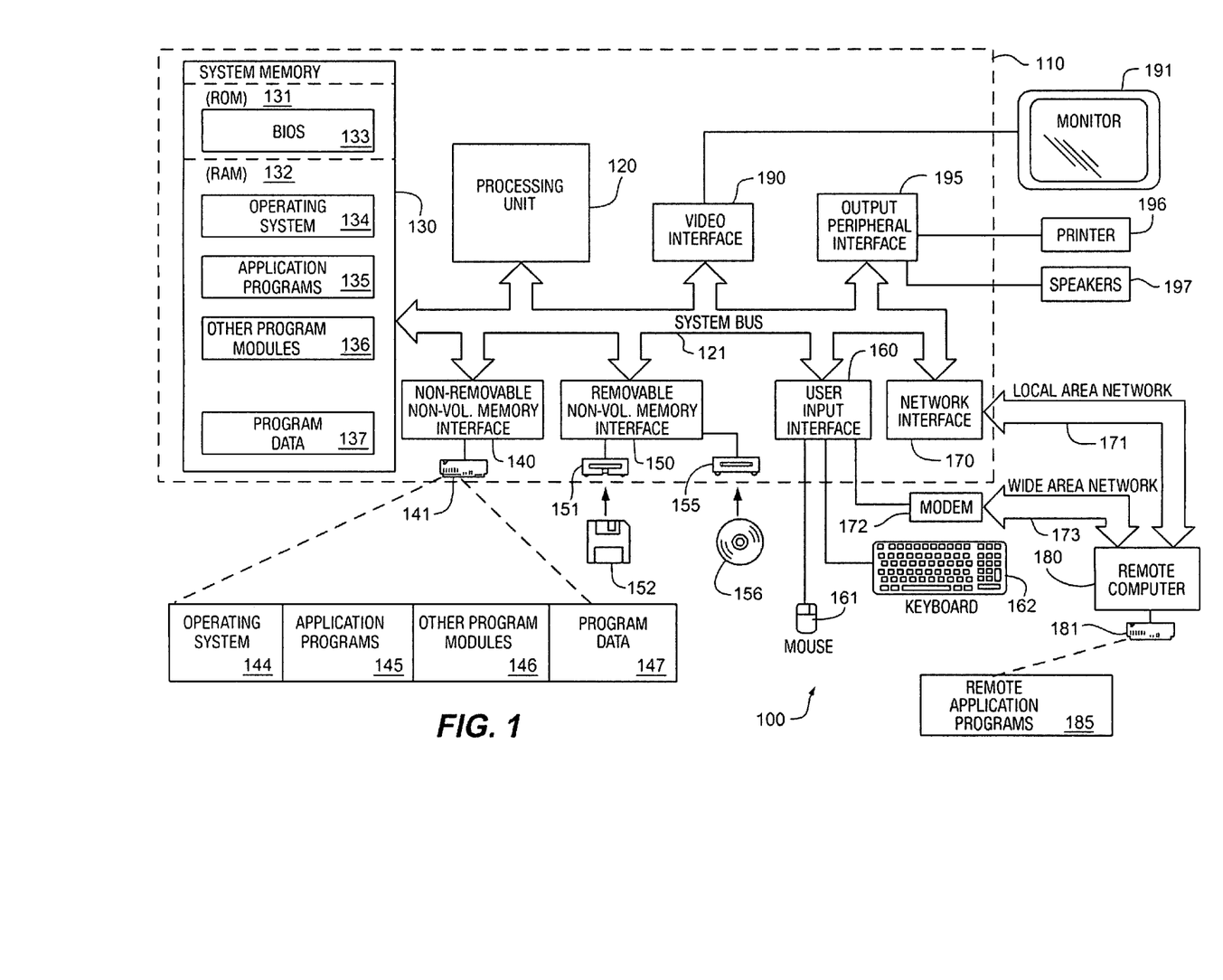
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
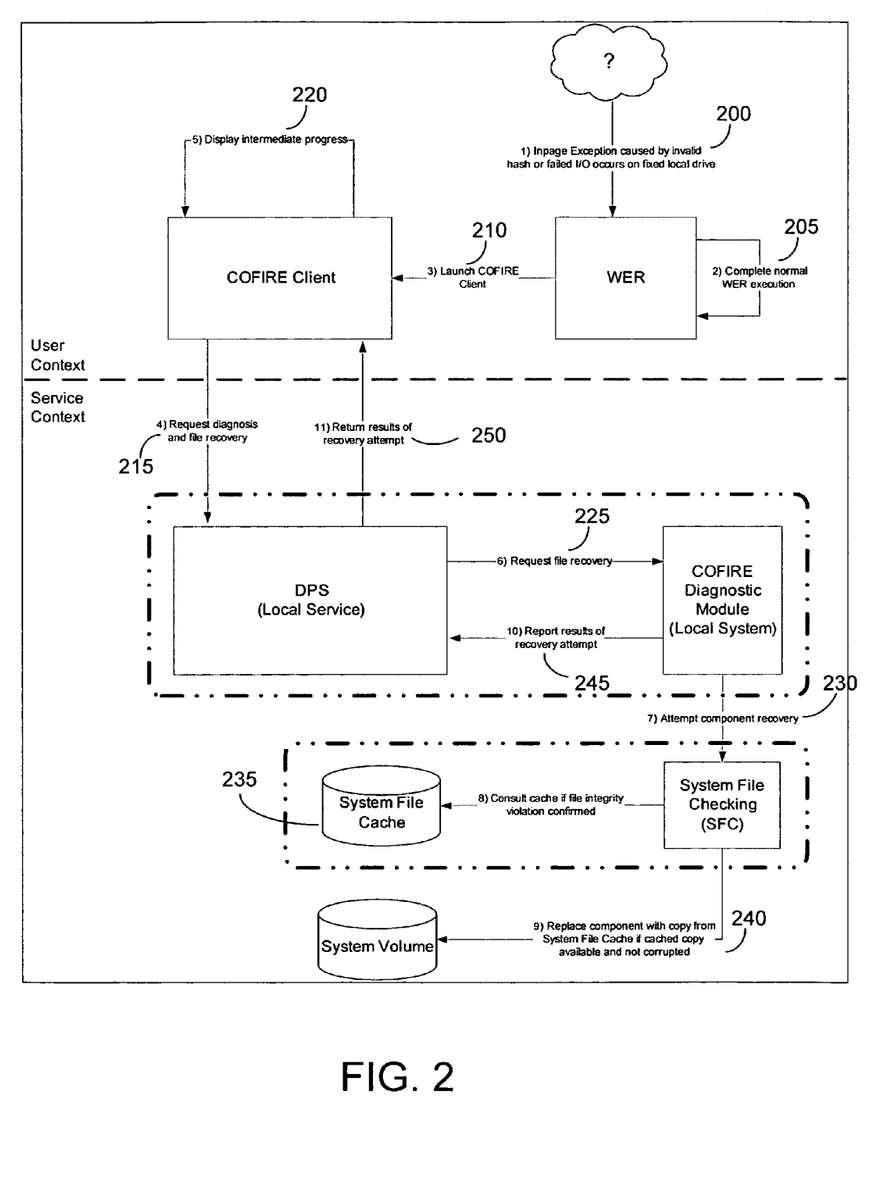
FIG. 2 is a high level illustration of a method of detecting and correcting corrupted pages used by an operating system.

FIG. 2 may be a high level illustration of a method of detecting and correcting corrupted pages used by an operating system. At a high level as shown in FIG. 2, an inpage exception may be noted 200. One way to note an inpage exception is through a hash mismatch such as when the hash, or signature, of a page is different from the hash that a code integrity module validates against. The code integrity module may store the per-page hashes of critical system components. When the code integrity module detects that a page being loaded no longer matches its expected hash, the code integrity module may return an error code and the memory manager may throw an InPageError exception. This exception may be caught by an error reporting module.

When the blocks composing a page on the disk are damaged, an I/O error may be detected by the disk. The disk I/O error may be noted by the disk class driver with a relevant status code such as STATUS_DEVICE_DATA_ERROR, preventing any data from being read. In these cases, the memory manger may throw an InPageError exception with a relevant status code such as STATUS_DEVICE_DATA_ER- ROR. As with the hash mismatch scenario, this exception may be intercepted by the error reporting module.

At block 205, the page error may be caught by an error reporting module such as the Windows Error Reporting module in Windows. The error reporting module may complete its normal execution based on whether the user has opted in for automatic error reporting. Once the error reporting module catches the exception, it may launch the diagnostic method at block 210. The error reporting module may be a client and may synchronously request diagnosis from the diagnostic module indirectly through the diagnostic policy service (DPS) 215. The error reporting module may not be a trace-based "fire & forget" scenario as some displays may be displayed in certain cases 220. Additionally, in cases where the diagnostic module display is shown, it may need to be coordinated with the error reporting user interface which may run interactively.

At block 225, the local diagnostic policy service may communicate a file recovery request to the inpage error diagnostic module. At block 230, the method may attempt component recovery by using the system file checking. The system file checking may consult with the system file cache 235 to determine if the file integrity violation is confirmed. The system file checking may also attempt to replace the component with a copy of the corrupt file from the system file cache 240 if the cached copy is available and is non-corrupted. If the faulting page resides on a fixed local drive in the same boot volume as the currently running OS, the diagnostic module may use the APIs provided by the system file checking API ("SFC") to attempt recovery of the component corresponding to the corrupted binary. If the file and associated component are present in the system file cache and the cached copies are not corrupted, then recovery of the entire component may occur.

At block 245, the inpage error diagnostic module may report the results of recovery attempts 245 to the local diagnostic policy which may then return the results of the recovery attempt to the inpage error client 250.

Figure 3:
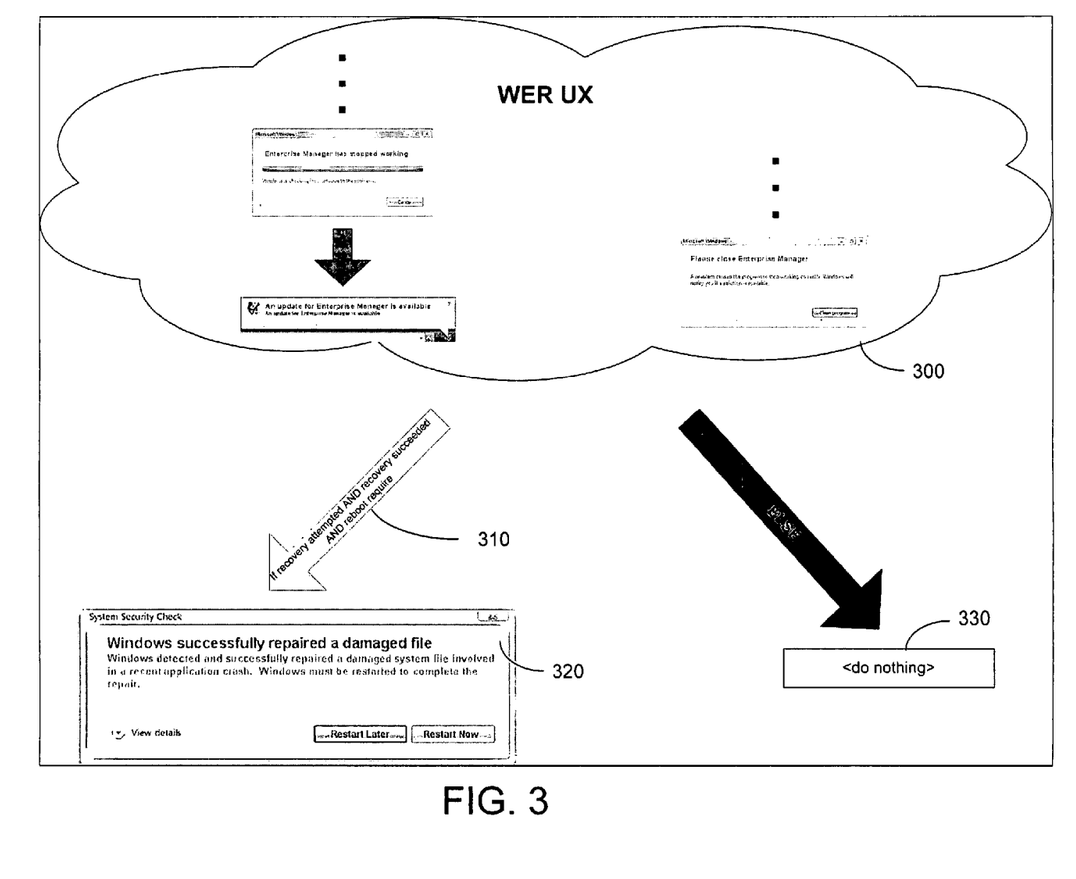
FIG. 3 is an illustration of some sample displays that may be created such as the displays 220 in FIG. 2.

FIG. 3 may be an illustration of some sample displays that may be created such as the displays 220 in FIG. 2. These screens may appear after the error reporting module completes its normal behavior 300. One of the goals for the method may be to keep the user exchange minimal and to display no user interface, if possible. In order to adhere to this goal, a dialog may only be shown in one case: recovery was successful AND system reboot is required 310. For this case, the user interface may be required because the user needs to take action in response to the reboot prompt 320. In all other cases, including those in which the file is actually not corrupted, no user interface may be shown 330. Additionally, another goal for the interface that may be used when the user interface is shown, the recovery attempt should be tied to the crash that triggered it. This is achieved by making the user interface resemble the error reporting module user interface.

Figure 4:
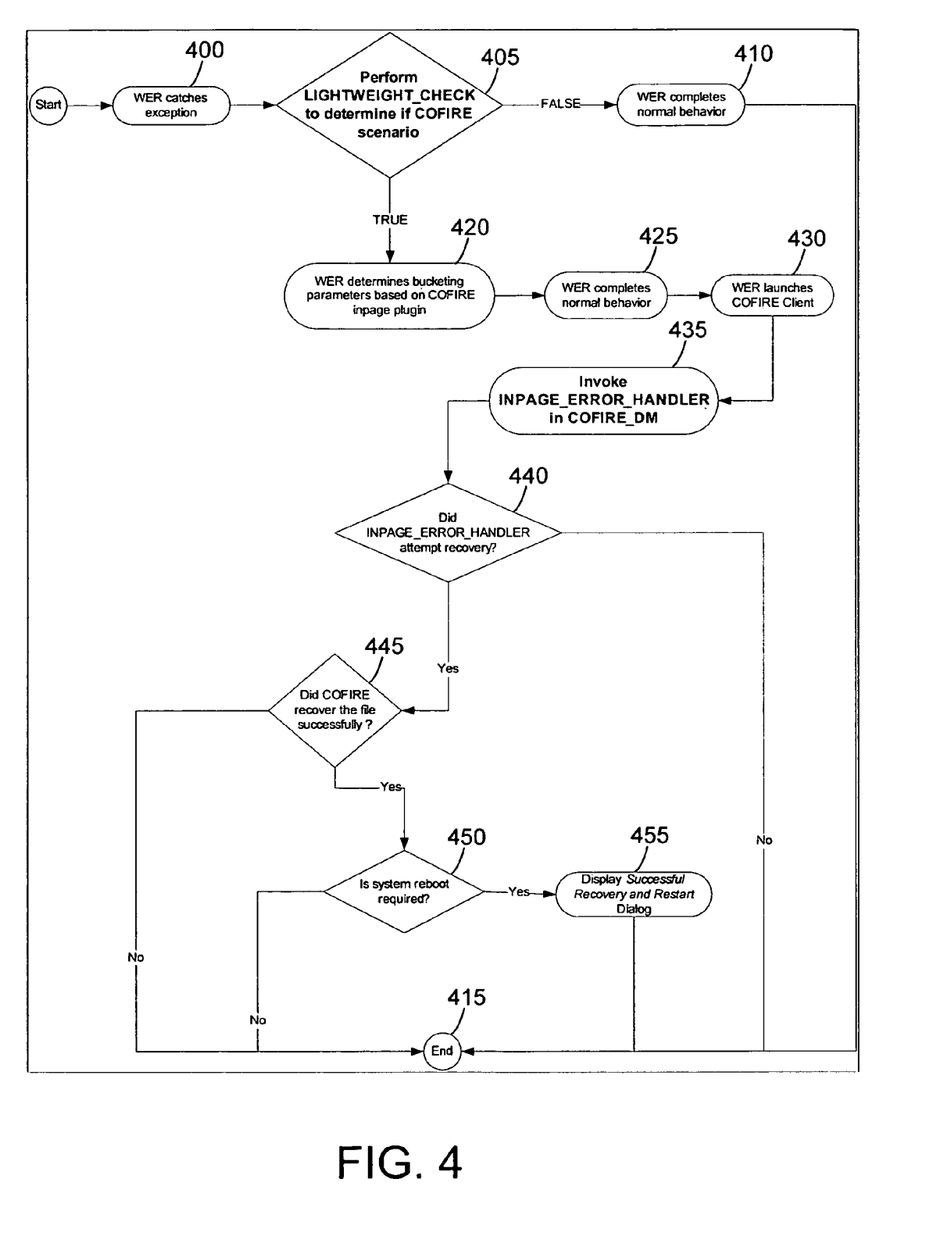
FIG. 4 is an illustration of the user exchange for the method.

FIG. 4 may be an illustration of the user exchange for the method. Note that the event labeled "Invoke INPAGE_ERROR_HANDLER in COFIRE_DM" corresponds to the flowchart in FIG. 6, while the decision labeled "Perform LIGHTWEIGHT_CHECK to determine if COFIRE scenario" corresponds to the flowchart in FIG. 7.

At block 400, the error reporting module may catch an exception. As noted previously, the exception may be a hash mismatch or a bad disk block. At block 405, the method may perform a lightweight or local check to determine if the problem noted is a problem the method is designed to address such as a page error. If the problem is not a problem the method is designed to address, the error reporting module may complete its normal behavior and the method may end at block 415. If the problem is a problem the method is designed to address, the error reporting module may determine what parameters should be collected as part of the error reporting module including the name of the file that caused the paging error 420. The error reporting method may complete its normal behavior at block 425 and then the error reporting module may start the inpage error handling client 430. At block 435, the method may invoke the error handler.

At block 440, the method may determine whether the inpage error handler attempted a recovery. If the inpage error handler does not attempt a recovery, the method may end at block 415. If the inpage error handler attempted a recovery, at block 445, the method may determine whether the inpage error handler recovered the file successfully. If the file was not successfully recovered, the method may end at block 415. If the file was successfully recovered, the method may determine whether a system reboot is required 450. If a system reboot is not required, the method may end at block 415. If a system reboot is required, at block the method may display 455 a successful recovery illustration (320 in FIG. 3) and the method may end at block 415.

Figure 5:
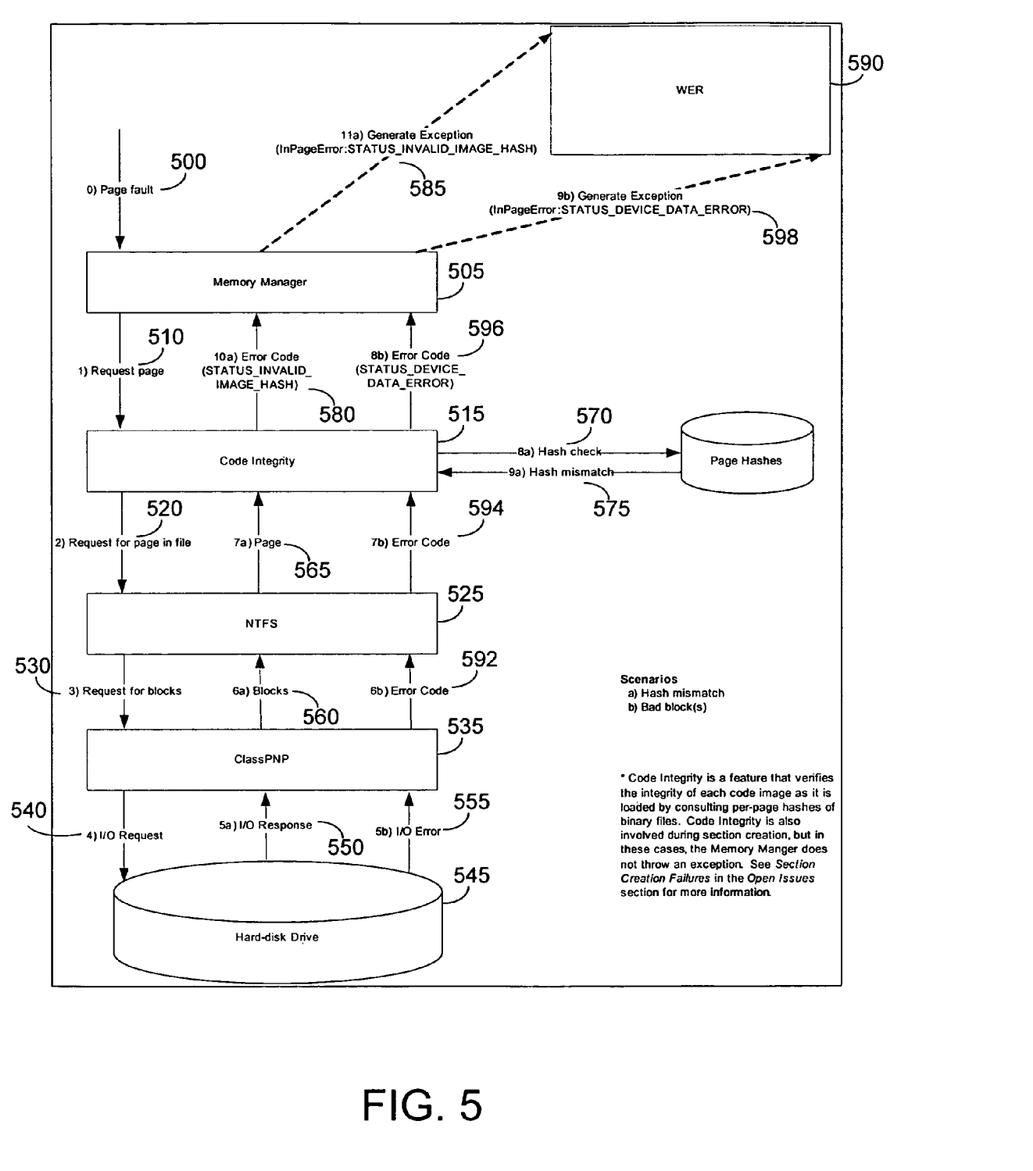
FIG. 5 is a layered view of the steps leading up to the generation of the types of inpage exceptions handled by the inpage error handler.

FIG. 5 may be a layered view of the steps leading up to the generation of the types of inpage exceptions handled by the inpage error handler. In general, once the error reporting module catches the exception, it may launch the inpage error handling client, which may synchronously request diagnosis from the inpage error diagnostic module indirectly through the diagnostic policy service (DPS). At block 500, a page fault may occur. At block 505, the memory manager 505 may request a page 510. The code integrity module 515 may pass the request for a page in a file 520 to a file system driver 525. In another embodiment, the page request 510 may be passed directly to the file system driver 525 without need of the code integrity module 515. The request for specific disk block 530 may be passed to ClassPNP 535 which may then may an I/O request 540 to the hard disk 545.

The hard disk may send an I/O response 550 or an I/O error 555. If an I/O response 550 is received by ClassPNP 535, the blocks of data 560 are communicated to the file system driver 525 which may then communicate the page data to the code integrity module 515. At block 565, the code integrity block 515 may perform a hash check on the data receive 570 compared to the page hashes previously calculated. If a hash mismatch is discovered, it is communicated at block 575 and at block 580, the memory manager 505 generates an exception 585 and reports the exception to the exception reporting module 590. A hash mismatch occurs when the hash, or signature, of a page is different from the hash that code integrity module validates against. Essentially, the code integrity module stores the per-page hashes of critical system components. When the code integrity module detects that a page being loaded no longer matches its expected hash, code integrity module will return an error code and the Memory Manager will throw an InPageError exception such as STATUS_INVALID_IMAGE_HASH as the status code. This exception will be caught by error reporting module.

If at block 550, an I/O error is sent 555 such as when the blocks composing a page on the disk are damaged, an I/O error may be detected by the disk and the ClassPNP may report an error code 592 to the file system 525. The error code may then be communicated to 594 to the code integrity module 515 and the error code 596 such as STATUS_DEVICE_DATA_ERROR may be reported to the memory manager 505. At block 598, the method may generate an exception which may be reported to the exception reporting module 590. As with the hash mismatch scenario, this exception will be intercepted by error reporting module.

Figure 6:
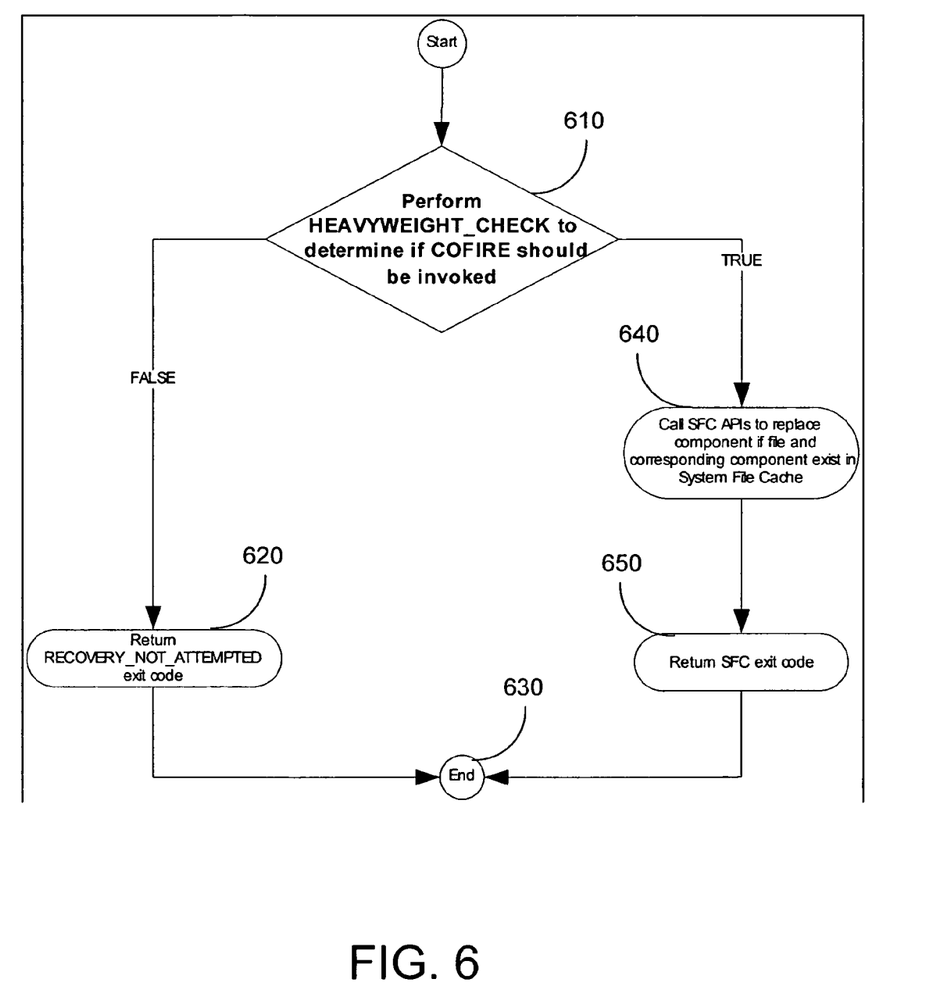
FIG. 6 is an illustration of the inpage error handling flow.
Figure 7:
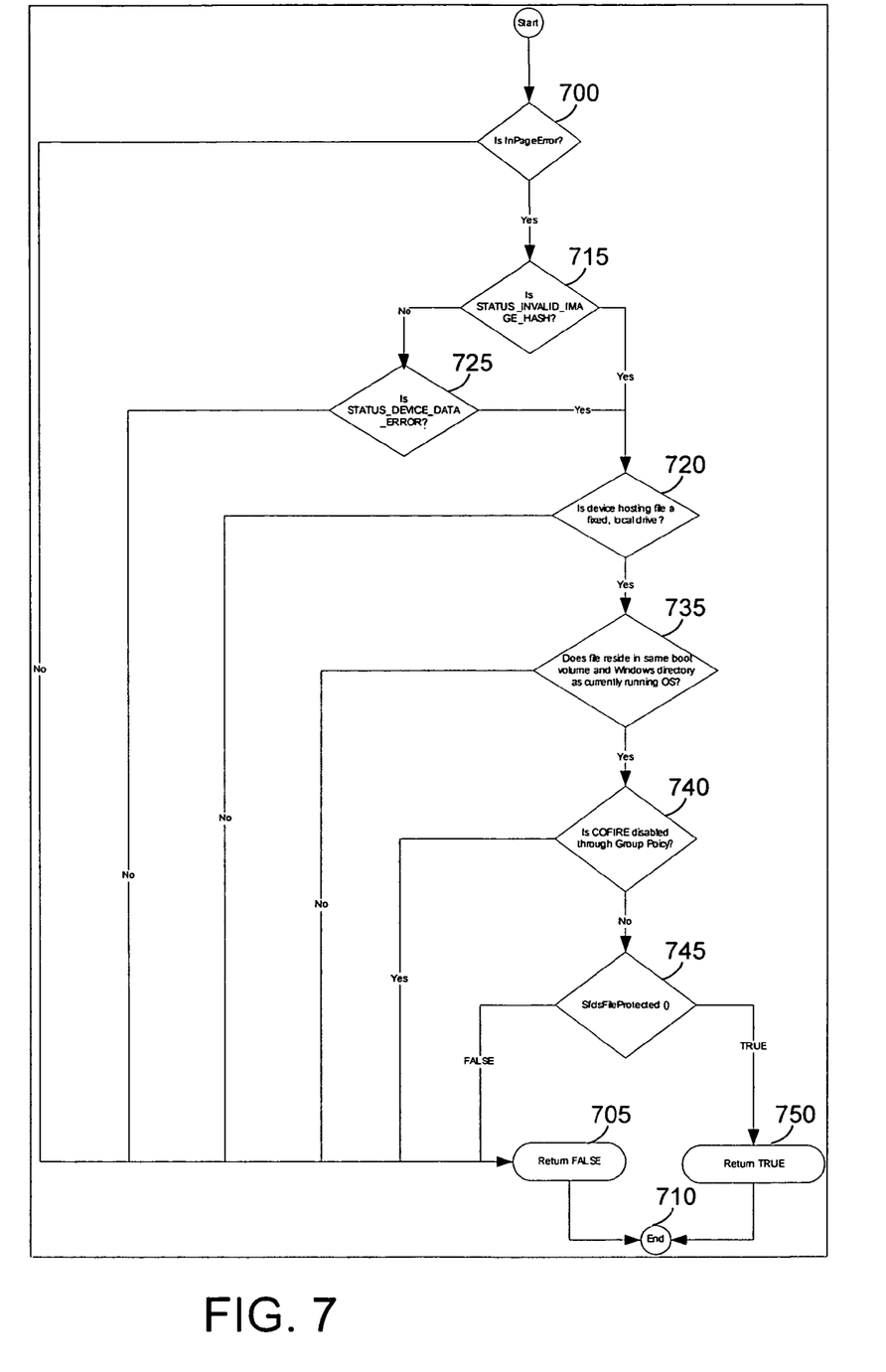
FIG. 7 is an illustration of the lightweight check.
Figure 8:
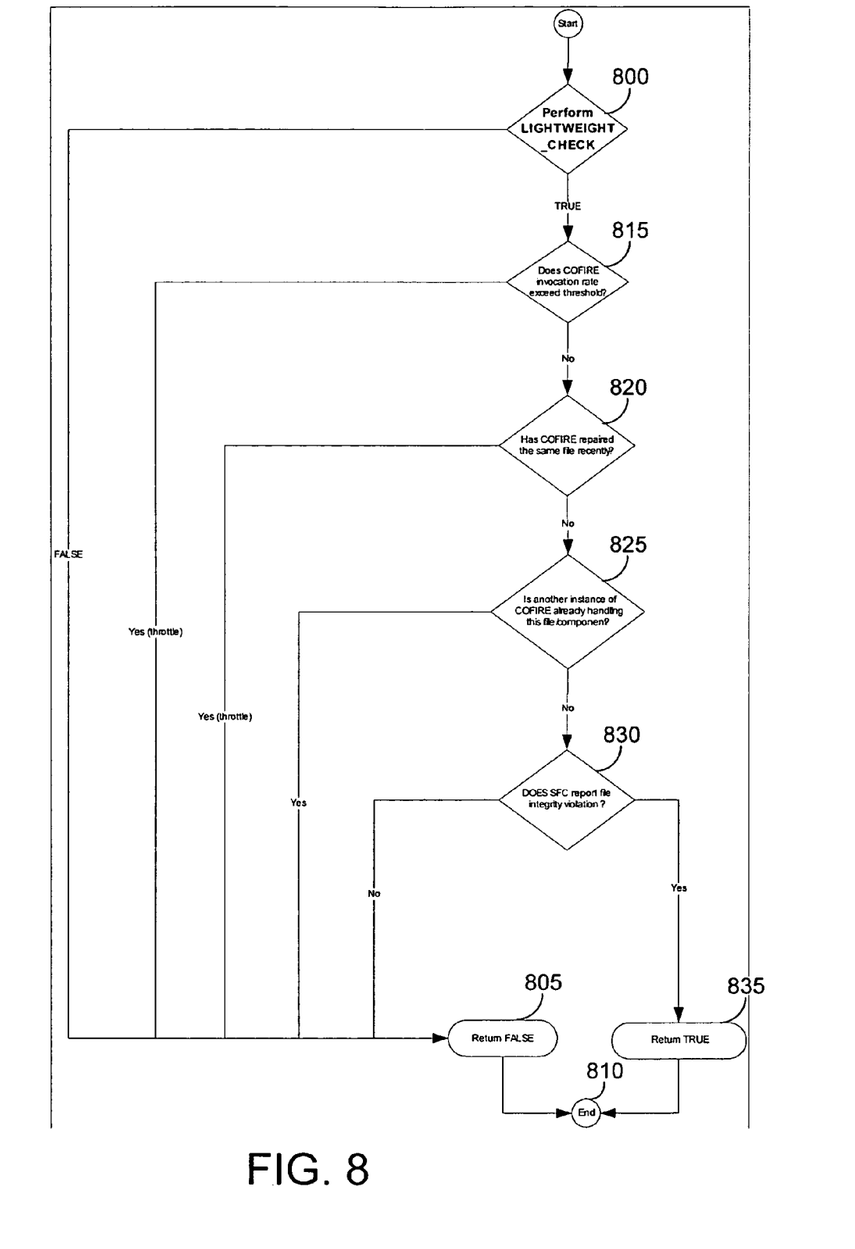
FIG. 8 illustrates a heavier check.

FIG. 6 may be an illustration of the inpage error handling flow. FIG. 6 may not apply to all inpage errors. It may be used by those inpage errors that pass the lightweight checks in FIG. 7. The LIGHTWEIGHT_CHECK logic in FIG. 7 is executed on the client side in error reporting module, while the expensive HEAVYWEIGHT_CHECK logic in FIG. 8 is executed only within the inpage error handling diagnostic module. Note that the HEAVYWEIGHT_CHECK logic may include the LIGHTWEIGHT_CHECK logic as well. By running through this series of checks on the client side, the inpage error handling executable does not need to be launched unless it is required. Running these checks on the server side may allow proper handling in the event of spoofed error reporting clients that attempt to trigger the inpage error recovery.

At block 610, the method may perform a heavyweight check to determine if the inpage error module should be invoked to make a call to the system file cache APIs. If the inpage error module is not invoked, an appropriate message is returned such as a RECOVERY_NOT_ATTEMPTED exit code 620 and the method may end at block 630. If block 610 determines that the heavyweight check should be invoked, at block 640, the method may call system file cache APIs to replace the component if the file and corresponding component exists in the system file cache. At block 650, the method may return the system file cache exit code and the method may end at block 630.

FIG. 7 may be an illustration of the lightweight check. At block 700, the method may determine whether the error is an inpage error. If the determination is no, the method may return false at block 705 and the method may end 710. If at block 700 the method determines that the error is an inpage error, at block 715, the method may determine whether the error is an invalid hash error. In another embodiment, code integrity may not be used and this check may not be performed.

If the method determines that the error is a hash error, control may pass to block 720. If the error is not a hash error, control may pass to block 725 where the method may determine whether the error is an I/O error. If the error is not an I/O error, the method may return false at block 705 and the method may end at block 710. If the error is a I/O error, control may pass to block 720 where the method may determine whether the device hosting file is a fixed, local file. The method may only operate on local drives as remote drives often suffer from communication errors and removable media is unlikely to contain OS system files and may also be read-only (as in the case of CDs or DVDs) so attempting inpage error recovery on this type of storage may not yield much reward. Additionally, fixed local drives may be specifically targeted because these are the drives on which the relevant System File Cache may be kept up-to-date.

At block 735, the method may determine whether the file resides in the same boot volume and operating system directory as the currently running operating system. If the determination is no, the method may return false at block 705 and the method may end at block 710. This check may be intended to prevent modification of files residing on a partition that belongs to another installed operating system instance with potentially different service. If the determination at block 735 is yes, control may pass to block 740.

At block 740, the method may determine if the inpage error handling module is disabled through a group policy. If the determination is yes, the method may return false at block 705 and the method may end at block 710.

At block 745, the method may determine whether the relevant system file cache file is protected. If the determination is false, the method may return false at block 705 and the method may end at block 710. If the determination is true, the method may return true at block 750 and the method may end at block 710.

FIG. 8 may illustrate a heavier check. At block 800, if all the lightweight checks pass as described in FIG. 7, then the inpage error handler may performs more expensive checks. If the value returned from the lightweight check of FIG. 7 is false, the method may return false at block 805 and the method may end at block 810. If the lightweight check of FIG. 7 returns true, at block 815, the method may determine whether the inpage error handler invocation rate threshold is exceeded. This throttling is intended to reduce the impact of spoofed error reporting clients designed to trigger the inpage error handler data manager. This spoofing is not excessively difficult because the error reporting module runs in user mode with limited user privilege, so malicious code does not need to run in kernel mode or in a privileged user-mode context for this to occur. Such malicious activity could cause denial of service through excessive inpage error handler disk I/O. Additionally, excessive inpage error handler invocation could also be a sign of imminent disk failure, in which case component recovery should be deferred in order to allow the user to back up critical files and perform drive replacement.

If the determination at block 815 is yes, then the method may return false at block 805 and the method may end at block 810. If the determination at block 815 is no, the method may determine at block 820 whether it encountered the same file recently. If so, it will skip recovery (by returning false at block 805 and the method may end at block 810) as the previous attempt was apparently unsuccessful and, hence, there may be no point trying again. If the determination is that the file has not been encountered recently, at block 825, the method may determine whether another instance of the inpage error handling module is already handling the file or component in question. If the determination is yes, the method may return false at block 805 and the method may end at block 810. If the determination is no, the method may pass control to block 830. At block 830, the method may also invoke the system file cache APIs to determine if there is, indeed, an integrity violation of the supposedly damaged file. If no integrity violation is reported, then recovery is skipped (by returning false at block 805 and the method may end at block 810). If the is not an integrity violation, the method may return true at block 835 and the method may end at block 810.

If all the checks pass, the inpage error handler may attempt recovery of the damaged file by invoking the system file checking APIs. Before system file cache attempts to replace the component associated with the file, it will perform an integrity check of the system file cache copy of the component with the expected hashes. If the backup copy is damaged, system file cache recovery will fail, resulting in the failure of the inpage error handler recovery attempt. Additionally, restart information is returned by the system file cache APIs in the success case, which is used by the inpage error handler to determine whether a system reboot is required.

The inpage error handler does not "hot-swap" files when the inpage error is encountered; execution fails resulting in a typical user-mode crash. Additionally, it should be noted that the inpage error handler does not handle kernel-mode inpage errors.

End-User Scenarios

Abby

One day, the iexplore.exe file on Abby's computer suffers from silent data corruption; her hard-disk drive was operating at a slightly higher temperature than recommended, causing magnetic domains in her drive to flip spontaneously. When she launches Internet Explorer, the code integrity module determines that the signature of a page in the iexplore.exe file is inconsistent with the stored hash for that page. Consequently, the code integrity module returns an error code that causes the memory manager to throw an inpage exception. An error reporting module such as Windows Error Reporting (WER) intercepts this exception and sends a report to the error reporting module backend since Abby has opted in for automatic error reporting. The inpage error diagnostic module is able to successfully replace the iexplore.exe file and its related component with the version in the System File Cache. The inpage error diagnostic module alerts Abby that the recovery succeeded and that a system reboot is required, as some of the files replaced were in use at the time of the repair. Abby clicks the "Restart Now" button to restart her computer. The next time Abby starts Internet Explorer, she is able to browse the Web.

Ichiro

Ichiro has configured his servers to automatically run Disk Defragmenter periodically. One of the hard-disk drives on one of his machines has a bad sector, rendering the Disk Defragmenter executable and other files unreadable. When Disk Defragmenter is supposed to run on this machine, the OS attempts to page in images from the executable, but is unable to do so because the blocks constituting the pages are unreadable. The I/O error causes an inpage exception to be thrown. As Ichiro has the inpage error autorecovery enabled on his servers, the inpage error automatically invokes the system file checking (SFC) APIs to attempt file recovery. Since the file is present in the system file cache, SFC replaces the corrupted file and associated component with a copy from the cache. Although the disk was not defragmented due to the problem encountered, the next time Disk Defragmenter is invoked, the defragmentation completes successfully. Additionally, the error and the action taken are logged to operating system event log. Ichiro later logs into the server and browses the logs in to view the error.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. An method of using inpage errors to identify and recover corrupt files comprising:
   noting an occurrence of an inpage exception;
   catching the inpage exception in an error reporting module;
   launching a local diagnostic policy service module;
   communicating a file recovery request from the local diagnostic policy service module to a local inpage diagnostic module;
   using the local inpage diagnostic module to attempt component recovery by using system file checking wherein the system file checking also attempts to replace the component with a copy of the corrupt file from the system file cache if the cached copy is available and is non-corrupted; and
   reporting the results of the recovery attempts of the local inpage error diagnostic module.

2. The method of claim 1, wherein the system file checking may consult with a system file cache to determine if file integrity violation is confirmed.

3. The method of claim 1, wherein if the corrupt file resides on a fixed local drive in the same boot volume as the currently running OS, the diagnostic module uses the APIs provided by the system file cache to attempt recovery of the component corresponding to the corrupted binary.

4. The method of claim 3, wherein if the file and associated component are present in the system file cache and the cached copies are not corrupted, then recovery of the entire component occurs.

5. The method of claim 1, further comprising storing in a code integrity module per-page hashes of critical system components and wherein noting an inpage exception is through a hash mismatch when a hash of a page is different from the hash that the code integrity module validates against.

6. The method of claim 5, further comprising if the code integrity module detects that a page being loaded no longer matches its expected hash, having the code integrity module return an error code and having a memory manager throw an exception.

7. The method of claim 6, further comprising catching the exception by the error reporting module.

8. The method of claim 1, further comprising if the blocks composing a page on the disk are damaged, detecting an I/O error by the disk.

9. The method of claim 8, further comprising noting the disk I/O error by the disk class driver with a relevant status code preventing any data from being read.

10. The method of claim 9, further comprising catching the exception by the error reporting module and storing the exception in a memory.

11. The method of claim 1, further comprising if a device hosting the corrupt file is not a local drive, ending the method.

12. The method of claim 1, further comprising if the corrupt file does not reside in the same boot volume and directory as currently running the operating system, ending the method.

13. The method of claim 1, further comprising if the method invocation rate exceeds a threshold, ending the method.

14. The method of claim 1, further comprising if the method recently repaired the same corrupt file, ending the method.

15. The method of claim 1, further comprising if another instance of the method is already handling the corrupt file, ending this instance of the method.

16. A computer readable storage medium that stores computer executable code, the code further comprising computer executable code for using page file errors to identify and recover corrupt files, the computer executable code comprising:
   computer executable code that notes an occurrence of an inpage exception;
   computer executable code that catches the inpage error in an error reporting module;
   computer executable code that launches a local diagnostic policy service module;
   computer executable code that communicates a file recovery request from the local diagnostic policy service module to a local inpage diagnostic module;

computer executable code that uses the local inpage diagnostic module to attempt component recovery by using system file checking wherein the system file checking also attempts to replace the component with a copy of the corrupt file from the system file cache if the cached copy is available and is non-corrupted; and computer executable code that reports the results of the recovery attempts of the local inpage error diagnostic module.

17. The computer readable storage medium of claim 16, the computer executable code ending the execution if:

a device hosting the file is not a local drive;

the corrupt file does not reside in a same boot volume and directory as currently running an operating system;

a method invocation rate exceeds a threshold;

a method recently repaired the same file; or another instance of the method is already handling the corrupt file.

18. A computer system comprising a processor that executes computer executable code, a memory that stores computer executable code and an input/output circuit, the processor being programmed to use page file errors to identify and recover corrupt files, the computer executable code comprising:

computer executable code that notes an occurrence of an inpage exception;

computer executable code that catches the page error in an error reporting module;

computer executable code that launches a local diagnostic policy service module;

computer executable code that communicates a file recovery request from the local diagnostic policy service module to a local inpage diagnostic module;

computer executable code that uses the local inpage diagnostic module to attempt component recovery by using system file checking wherein the system file checking also attempts to replace the component with a copy of the corrupt file from the system file cache if the cached copy is available and is non-corrupted; and computer executable code that reports the results of the recovery attempts of the local inpage error diagnostic module.

19. The computer system of claim 18, the computer executable code ending the execution if:

a device hosting the file is not a local drive;

the corrupt file does not reside in the same boot volume and directory as currently running the operating system;

a method invocation rate exceeds a threshold;

a method recently repaired the same file; or another instance of the method is already handling the corrupt file.

* * * * *

UNITED STATES PATENT AND TRADEMARK OFFICE
CERTIFICATE OF CORRECTION

PATENT NO. : 7,594,136 B2  Page 1 of 1
APPLICATION NO. : 11/406671
DATED : September 22, 2009
INVENTOR(S) : Kerner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Twenty-eighth Day of September, 2010

David J. Kappos
*Director of the United States Patent and Trademark Office*